United States Patent [19]

Whiteley et al.

[11] 4,193,199
[45] Mar. 18, 1980

[54] SHAFT POSITION TRANSDUCER

[75] Inventors: Glenn R. Whiteley, Pasadena; Michael F. Bent, South Pasadena, both of Calif.

[73] Assignee: Servo Products Company, Pasadena, Calif.

[21] Appl. No.: 906,073

[22] Filed: May 15, 1978

[51] Int. Cl.² .................... G01B 3/18; G01D 5/34
[52] U.S. Cl. ........................ 33/1 PT; 33/125 C; 33/166; 250/231 SE
[58] Field of Search .......... 33/1 PT, 1 L, 125 A, 33/125 C, 166; 250/227, 231 SE

[56] References Cited
U.S. PATENT DOCUMENTS

| | | | |
|---|---|---|---|
| 2,685,083 | 7/1954 | Beman | 250/231 SE |
| 2,804,687 | 9/1957 | Malfeld | 33/1 L |
| 3,189,890 | 6/1965 | Gilbert et al. | 340/347 |
| 3,482,321 | 12/1969 | Inshaw | 33/166 |
| 3,686,766 | 8/1972 | Matumoto | 33/166 |
| 4,096,383 | 6/1978 | Mancini et al. | 250/227 X |

*Primary Examiner*—William D. Martin, Jr.
*Attorney, Agent, or Firm*—Edward J. DaRin, Inc.

[57] ABSTRACT

A shaft position transducer constructed and defined with a pair of rotary scales for measuring increments of rotation in the English or metric systems. The rotary scale movements are sensed by means of solid state light sensing packages for producing output signals in phase quadrature. The light sensing packages are mounted in the correct relationship without the need for adjustments.

12 Claims, 11 Drawing Figures

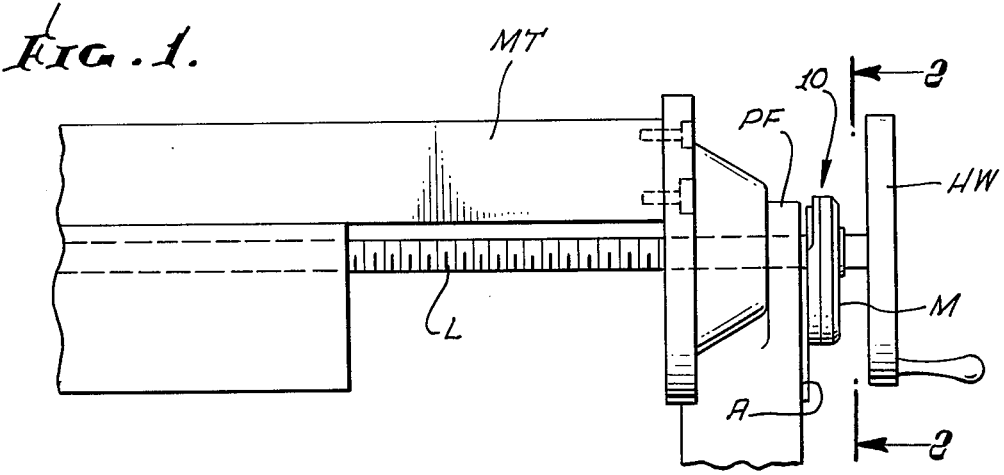
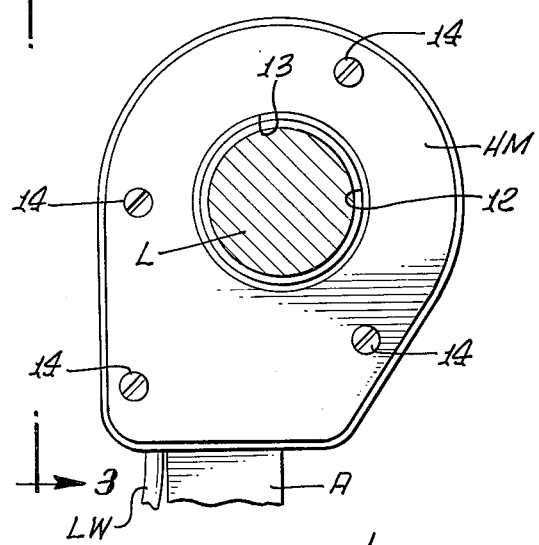
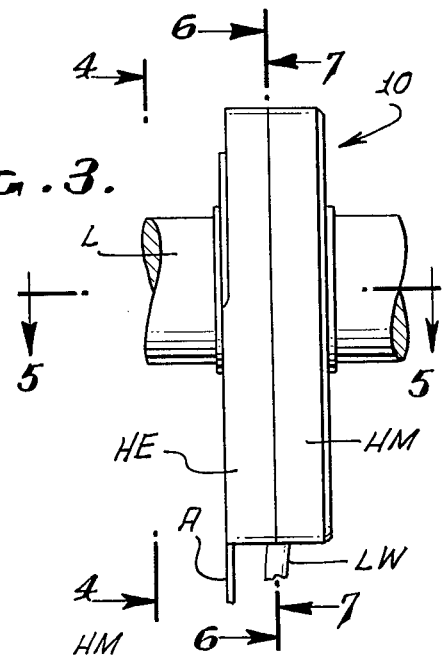
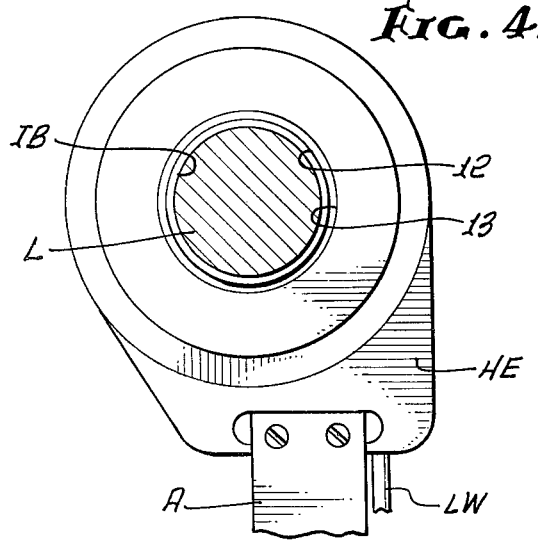
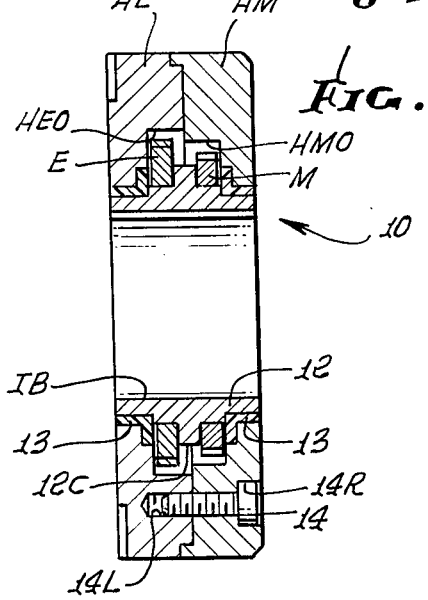

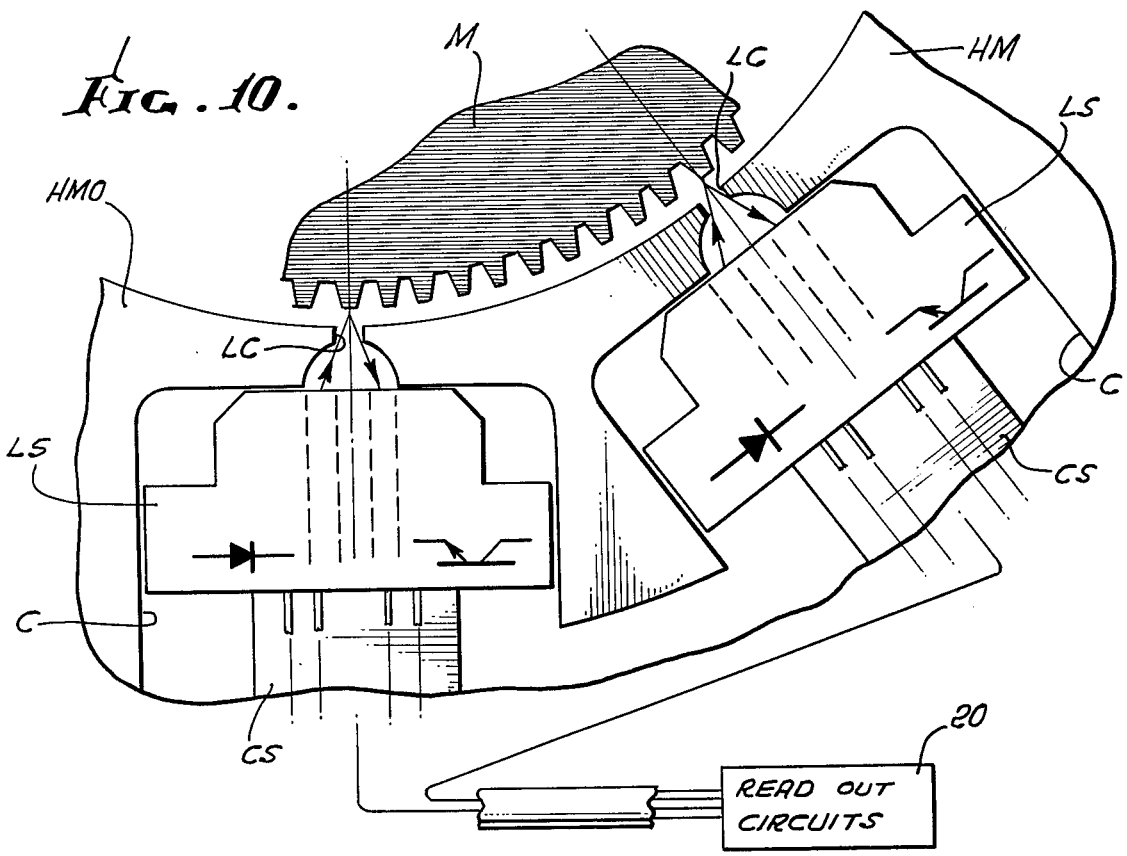
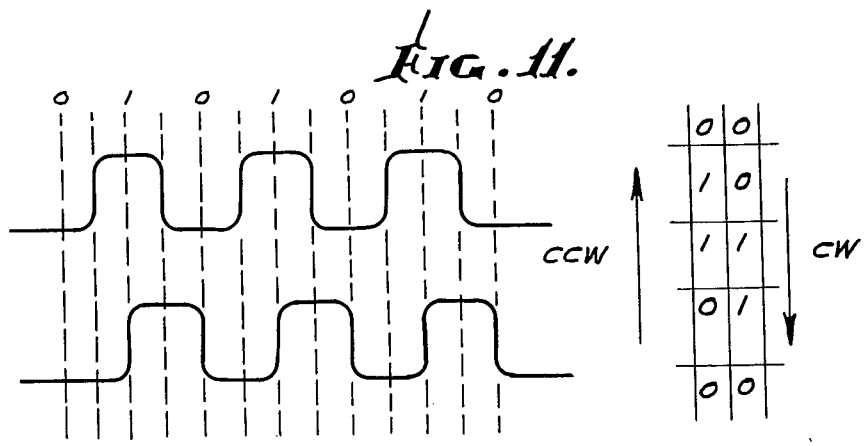

SHAFT POSITION TRANSDUCER

PRIOR ART AND SUMMARY OF THE INVENTION

Various types of devices have been developed for sensing and indicating movement of machine elements in automated machine tool systems. Generally, these devices provide a very accurate method of incremental movement of a machine element but are very expensive. Machine tools that are employed in machine shops on a much smaller scale employ power feeds and handcranks for controlling machine elements such as lead screws. These smaller types of machine tools may include mechanical dials and counters for sensing the rotations of the lead screw and indicating the incremental changes to the operator. The machine operator generally has to read the dials and/or counters to determine the position of the screw. These mechanical devices have been replaced in some machine shops with digital readout devices utilized for electronically sensing and indicating the incremental movements of the lead screw. These devices generally include some form of shaft position transducer or encoder that may be readily mounted to a lead screw in lieu of the mechanical dials and/or counters and are coupled to electronic circuits for counting the signals produced by the encoder for displaying them to the operator. This type of encoder or transducer is used where the lead screw of the machine tool provides adequate resolution of the lead screw movements, i.e., five turns per inch. These digital readout devices provide an output indication or display of the incremental movements in either the English or metric systems. Some prior art digital readout systems utilize an electronic conversion for translating the sensed incremental movements between the English and metric systems, while others utilize a pair of scale elements for directly reading out the movements in the different measuring systems without the need for electronic conversion between the two systems. There is still a need for a relatively inexpensive, simple shaft position transducer or encoder that can be readily mounted to a machine tool with a minimum amount of effort and can be employed in the smaller machine tools utilized in the machine shops or the like.

The present invention provides an improved, relatively inexpensive, hollow shaft position transducer that may be readily mounted to a machine tool screw in combination with a power feed that provides direct electronic readouts of incremental shaft position movements in either metric units or English units without requiring electronic translation circuits for switching between the two measuring systems. The transducer of the present invention is simply constructed and defined to utilize a minimum of parts without the need for adjustments or maintenance and that is relatively inexpensive to manufacture and assemble. The transducer utilizes a gear-like element as a rotary scale element in combination with solid state light sensing packages that may be quickly mounted in the transducer housing with a minimum amount of skill. The light sensing packages may simply be dropped into place without the need for any adjustments at the time of assembly or any other time, for producing electrical output signals in phase quadrature representative of the incremental movements of the scale. The transducer may include a pair of rotary scale elements for providing output signals representative of the incremental movements in either the English or the metric systems.

From a structural standpoint, the shaft position transducer of the present invention is adapted to be mounted on a shaft and comprises rotary scale means in the form of a gear with the top surface of the gear teeth having light characteristics of one kind and the remaining surfaces having light characteristics of another kind. The top surfaces of the gear teeth may be light reflecting while the remaining surfaces are light absorbent. The housing that is provided for the rotary scale means has an internally constructed circular opening for permitting the rotary scale to rotate therein and to be completely enclosed within the internal circular opening. The housing is constructed with a pair of internal cavities for mounting the light sensing packages in each of the cavities defined on the inside surface of the housing at a location spaced outwardly of the rotary scale and the internal circular opening. Each cavity has a small opening that communicates with the circular opening for the rotary scale and functions as a light sensing aperture. The light sensing packages each have a light source and a light sensor arranged in a side-by-side relationship in the package and which packages are adapted to be snugly mounted in and retained in their respective cavities. The light sensing packages are further defined to permit the light rays emitted from the light source to impinge on the rotary scale by being conveyed through the small opening and to be reflected from the scale to impinge on the light sensor for providing electrical analog signals from the sensor that are representative of the successive gear teeth as they are rotated by the small opening in unison with the rotation of the shaft upon which it is mounted.

These and other features of the present invention will be more fully appreciated when considered in the light of the following specification and drawings, in which:

FIG. 1 is a partial, elevational view of a milling machine table and lead screw with the power feed device having the shaft position transducer of the present invention mounted thereon:

FIG. 2 is a sectional view taken along the line 2—2 of FIG. 1 but with the bracket arm securing the transducer to the machine tool illustrated broken away;

FIG. 3 is a view taken along the line 3—3 of FIG. 2;

FIG. 4 is a view taken along the line 4—4 of FIG. 3;

FIG. 5 is a view taken along line 5—5 of FIG. 3 but with the transducer removed from the shaft;

FIG. 10 is a partial, enlarged view of a portion of a rotary scale and the light sensing packages as mounted in the transducer housing; and FIG. 11 is a graphical representation of the pair of train of signals in phase quadrature generated by the light sensing packages as illustrated in FIG. 10.

Figure 6:
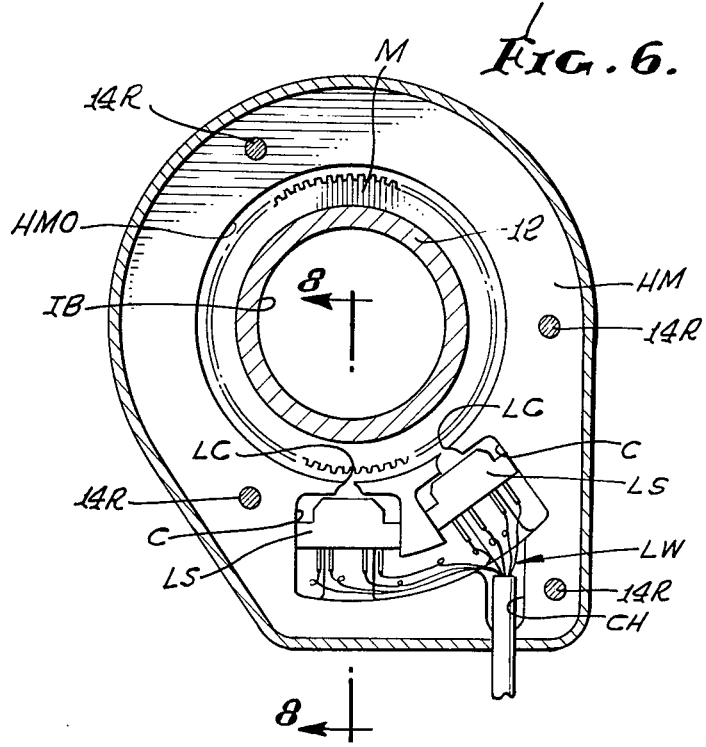
FIG. 6 is a view taken along line 6—6 of FIG. 3 but with the transducer removed from the shaft.
Figure 8:
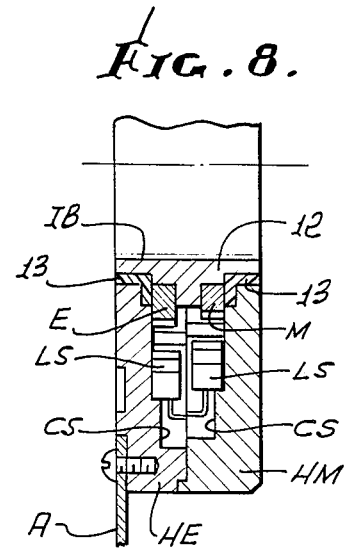
FIG. 8 is a view taken along the line 8—8 of FIG. 6.

The present invention will now be described in detail, with reference to the drawings, as it may be utilized on a commercially available milling machine such as a Bridgeport milling machine or other similar commercially available milling machines. The shaft position transducer of the present invention may be mounted to a power feed of the type manufactured and sold by Servo Products Co. of Altadena, California, for use on the aforementioned types of milling machines. As illustrated in FIG. 1, the shaft position transducer 10 is mounted on the aforementioned type of commercially available power feed PF on the inside of the handwheel HW and adjacent the body proper of feed PF. The power feed PF is illustrated secured to the table of the milling machine MT. The power feed PF controls the rotation of the lead screw L. When the lead screw L is rotated, the incremental movements of the screw are sensed and signalled by the transducer 10 by providing electrical output signals representative of the incremental movements thereof. The mounting position of the transducer 10, as illustrated in FIG. 1, is the position occupied by the mechanical dial normally provided with the prior art type of power feeds, PF, i.e., the type 70 and 90 power feeds commercially available from Servo Products Co. It should also be appreciated that the transducer 10 can be mounted in a side-by-side relationship with the dials normally provided with such power feeds. The lead screws that are most commonly employed on such machine tools have a standard displacement of 0.2 inch per revolution of the screw or five turns per inch of screw thread. Accordingly, the accuracy of the transducer 10 is constructed and defined to be the same as the accuracy of such commercially utilized lead screws L.

The shaft position transducer 10 is constructed and defined to directly provide electrical output signals representative of the increments of movements of a shaft in either the English or metric units of measurements. The electrical signals provided by the transducer 10 comprise a pair of trains of signals that are electrically in phase quadrature with respect to each other for each of the two measuring systems; see FIG. 11. With the standard lead screw having five turns per inch or 0.2 inch displacement per revolution of lead screw a linear position resolution of 0.0005 inch can be obtained by the shaft position transducer 10 of the present invention. This resolution is obtained by dividing one rotation, 360°, by 400 (100×4) to obtain said resolution. This resolution is obtained in the English system by using a gear as a rotary scale that is provided with 100 teeth, a pitch diameter of 2.121 inches, an outside diameter of 2.1250 inches, a pitch angle of 20 degrees for the teeth and a pitch of 48. In the metric system, a similar gear is utilized as a rotary scale which has 127 teeth, a pitch diameter of 2.0127 inches, an outside diameter of 2.01257 inches, a pitch angle of 14.50 degrees and a pitch of 64. With this metric rotary scale, a resolution of 0.01 millimeters is obtained. Each rotary scale has a bore of 1.5625 inches in diameter for accepting a shaft to be measured.

Figure 9:
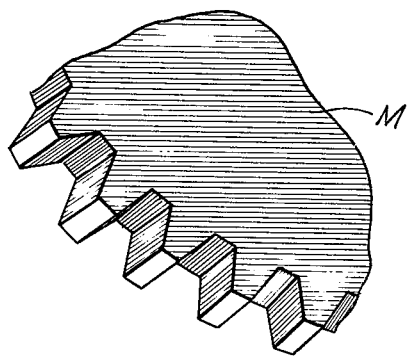
FIG. 9 is a partial, perspective view of one of the rotary scales utilized in the shaft position transducer of the present invention and illustrating the light characteristics thereof.

The gear functioning as the metric rotary scale is identified by the reference character M while the gear functioning as the English rotary scale is identified by the reference character E. The rotary scales E and M are mounted on a bushing 12 having a stepped outside configuration as best appreciated from examining FIG. 5. The scale mounting bushing 12 is arranged to mount the rotary scale E and M in a side-by-side spaced relationship on the opposite sides of the highest step element 12C, as viewed in FIG. 5. Each rotary scale E and M is constructed and defined to have the desired light characteristics for sensing the incremental motions of the shaft to which it is coupled. To this end, the entire gear is advantageously provided with a thin film of light absorbing properties and with the top surface of the teeth of each rotary scale being polished to function as a light reflecting surface. The thin film may be provided by means of anodizing a black film thereon. The arrangement of the teeth for the rotary scale and the areas between the teeth are preferably defined to provide a train of signals that are 50 percent ON and 50 percent OFF between the "light" signals and the "dark" signals; see FIG. 11. The overall light reflecting and light absorbing characteristics of the rotary scale M are illustrated in FIG. 9.

The transducer 10 is constructed of a two-piece housing with each piece HE and HM having the same general outside configuration so that the two pieces may be secured together to enclose the pair of rotary scales M and E therebetween in a clam shell fashion. The two pieces HE and HM may be secured together by means of fasteners 14 extending through counter-sunk openings 14R spaced on the outside of the piece HM. The fasteners 14 (four are shown) extend into threading openings 14L provided on the inside surface of the piece HE; see FIG. 5. The scale mounting bushing 12 is positioned between the pieces HE and HM and is secured in position when the two pieces are secured together by means of the fasteners 14. One housing piece HM, is constructed and defined to receive and mount the rotary scale member M while the other housing piece HE is constructed and defined to receive and mount the E rotary scale. The scale mounting bushing 12 is positioned so that the metric rotary scale M is enclosed within the internal circular opening HMO to be enclosed and rotated therein. Similarly, the rotary scale E is arranged to be enclosed and rotated within the circular opening HEO on the inside of the housing piece HE. To seal the transducer 10, each housing piece carries a bushing 13 arranged between the internal bores HEO and HMO for each of the pieces HM and HE and the rotary scale mounting bushing 12. The bushings 13 may be constructed of a plastic material such as a commercially available Delran plastic. These seals 13 seal the internal portions of the transducer 10 and in particular the rotary scales E and M from the machine tool environment in which the transducer 10 is employed. The internal bore for the bushing 12 is identified as the IB bore and is of a diameter to be readily mounted on a lead screw such as the lead screw L, or a shaft position to be measured.

The sealed construction of the transducer 10, along with the light absorbing characteristics for all of the major surfaces provides a good light environment for optically sensing the rotary scales with a minimum amount of stray light, reflecting surfaces, etc.

Figure 7:
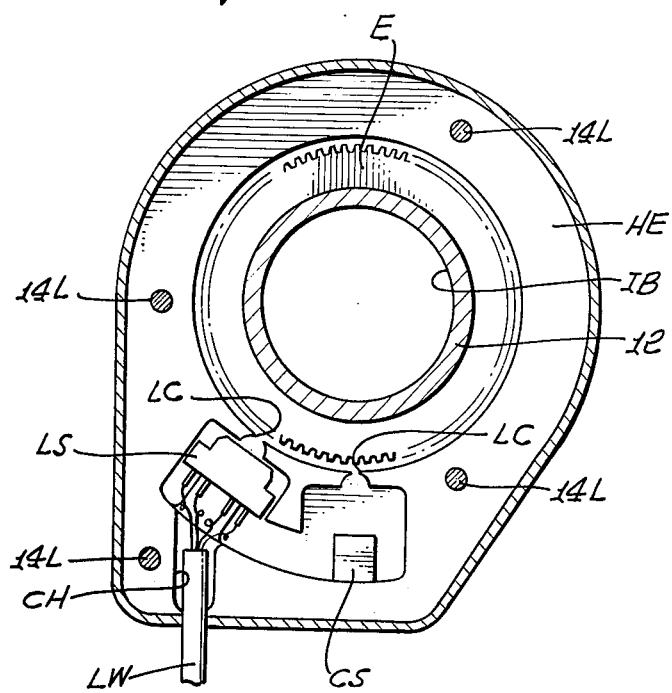
FIG. 7 is a view taken along the line 7—7 of FIG. 3 but with the transducer removed from the shaft and one of the light sensing packages omitted.

Each housing piece HM and HE has a pair of spaced, internal cavities constructed and defined thereon for receiving and snugly mounting individual light sensing packages LS. The internal construction of the housing pieces HM and HE are defined identically so that the light sensing packages LS can be mounted side-by-side in each piece as can be best appreciated by examining FIG. 10. The light sensing packages LS employed for the purposes of the present invention are commercially available light sensing packages. The light sensing packages LS are preferably those manufactured and sold by Texas Instruments of Dallas, Texas and are identified as their Model TIL 149-L77 13 series. Such a light sensing package LS includes a light emitting diode as the light source and a phototransistor as a light sensor illustrated by their symbols. The light sensor and the light source are arranged in a side-by-side relationship in the light sensing package LS opposite individual circular apertures provided in the packages for permitting the light rays from the light source to be directed outwardly therefrom and to permit any reflected light rays to impinge on the light sensor. These light channels are illustrated in dotted outline in FIG. 10. The light sensing packages LS are mounted in each of the cavities C defined on each piece HE and HM for the transducer 10. Each cavitiy C has a general overall configuration that corresponds to the outer configuration of the light sensing packages LS to be snugly mounted therein. The pair of cavities C for the individual housing pieces are arranged in communication on each piece HM and HE; see FIG. 7. The cavity C includes a light channel LC arranged in communication with the individual apertures HMO and HEO for mounting the rotary scales M and E respectively. The light channel LS collimates the light rays emitted from the light source arranged in each package LS and receives any light rays reflected from the rotary scales to permit them to impinge upon the light sensor. The light channels LS also improve the ON-OFF signal ratio discussed hereinabove. To function effectively the cavities C and light channels LS must be positioned to better than 0.010 inches.

The cavities C are advantageously constructed and defined to permit the light sensing packages LS to be readily received within the cavities and to be snugly mounted therein so that they can simply mounted without the need for any adjustments, either at the time of assembly or any other time. A stepped portion CS is defined on the inside surface of the cavity C to abut the back surface of the package LS to assure that the light sensing package LS does not move out of its mounted position once correctly positioned therein. Such a stepped section CS is particularly evident from examining FIG. 7 in the cavity C having the light sensing package LS removed therefrom. The spacing of the adjacent pair of cavities C on each housing piece is arranged and defined relative to the rotary scales E and M so that the electrical signals produced at the light sensors for the adjacent light sensing packages LS are produced in phase quadrature. Stated differently, the geometric arrangement of each cavity C on a housing piece HE or HM is constructed and defined relative to the rotary scales and the number of teeth to provide the desired quadrature relationship of the electrical signals so as to eliminate any need for adjustments for the light sensing package LS at any time. The lead wires LW, shown in a cable, from each of the light sensing packages LS may be conveyed through a channel CH arranged on each housing piece HM and HE, as is evident from examining the drawings.

The transducer 10 is prevented from rotating with the rotation of the shaft to be measured by provisions in the housing piece HE to receive and secure a restraining arm A. The arm A may be secured to the machine tool MT at a convenient position and is illustrated with its free end broken off.

With this arrangement in mind, the enlarged portion of the rotary scale MS as illustrated in FIG. 6 can be further examined. The pair of cavities C illustrated in FIG. 10 are each illustrated with a mounted light sensing package LS with the light sensing aperture LC arranged in communication with the internal opening HMO accommodating the metric scale M. The light rays from the light source in the light sensing packages LS are illustrated as being conveyed in an angular relationship through the light sensing opening LC to impinge on a tooth of the rotary scale M. With the face of the teeth of the scale M defined as light reflecting surfaces, the light rays impinging thereon will be reflected back through the light channel LC to impinge on the light sensor arranged in the same package LS, as illustrated in FIG. 10. The same relationship for the light rays is illustrated for the other light sensing package LS illustrated in FIG. 10. To provide the phase quadrature relationship of the signals from each light sensing package the light rays from one package LS is illustrated as impinging approximately at the center of the top surface of one of the teeth for the rotary scale M while the light rays for the other light sensing package LS impinge at the edge of the tooth for the rotary scale. This spacing produces the desired phase quadrature relationship for the electrical signals of the light signals from each light sensor. As illustrated in FIG. 10, the distance between the points of impingement for the light rays from each light sensing package LS is nine teeth.

The signals from the light sensing packages LS are coupled to appropriate readout circuitry 20 for shaping, counting and displaying the signals for signalling and displaying the incremental movements of the rotary scale to the machine operator. The readout circuits 20 examine the binary state of the signals from each light sensing package to determine the incremental movements of the rotary scale and the direction of movement or rotation. In terms of binary notation a light signal or a signal reflected from the tooth may be considered as a binary 1 while the light rays that is absorbed by the rotary scale and does not produce an output indication from the light sensor can be considered as a binary 0 or the absence of a tooth. The sensed output signals provided by the light sensors essentially reproduce in an analog sense the teeth on the rotary scale as is evident from FIG. 11. The incremental movements are displayed by examining the state of each binary train of signals so that the intelligence of the movements of the rotary scales may be determined to signal the machine operator. As is evident from FIG. 11, each incremental movement of the rotary scale MS is defined to produce the binary counts 00 10 11 10 and 00 as the rotary scale M moves in the clockwise direction and vice versa when moved in the counterclockwise direction. The same arrangement for the scale E prevails as for the scale M.

What is claimed is:

1. A shaft position transducer adapted to be mounted on a shaft comprising
   a bushing carrying a rotary scale means in the form of a gear having a plurality of equally spaced gear teeth and with the top surface of the gear teeth having light characteristics of one kind and the areas between the teeth having light characteristics of another kind,
   a housing constructed of two pieces adapted to be secured together for enclosing the bushing and the rotary scale means, one housing piece having an internally constructed circular opening for permitting the rotary scale to rotate in one housing piece and to be completely enclosed within the internal circular opening of said one housing piece, said housing pieces having a central aperture for mounting the bushing therein, a pair of cavities for mounting a light sensing package in each of the cavities defined on the inside surface of the housing in said one housing piece at a location spaced radially outwardly of the circular opening for the rotary scale, each cavity having a small opening communicating with the circular opening of said one housing piece, a light sensing package having a light source and a light sensor arranged in a side-by-side relationship in the package and adapted to be snugly mounted in and retained in the circuit package cavity in a preselected nonmovable position, one of said packages being mounted in each of the cavities and being retained therein without possibility of movement when in use, the light sensing packages being further defined to permit the light rays emitted from each of said light sources to impinge on the rotary scale by being conveyed thorugh the individual small opening and be reflected therefrom and being reconveyed through said small opening to impinge on the light sensor for providing electrical analog signals representative of the successive gear teeth when the top surfaces of the rotary scale means rotates past each of said small openings.

2. A shaft position transducer adapted to be mounted on a shaft as defined in claim 1 wherein each light sensing package comprises a light emitting diode as the light source and a phototransistor as the light sensor arranged side-by-side in the package.

3. A shaft position transducer adapted to be mounted on a shaft as defined in claim 1 wherein the rotary scale member has the teeth and the adjacent areas defined to produce a train of signals that are approximately 50 percent of one kind and 50 percent of the opposite kind, the rotary scale having a preselected number of teeth for defining increments of linear movement in response to the rotations of the shaft on which it is mounted in a preselected measuring system.

4. A shaft position transducer adapted to be mounted on a shaft as defined in claim 3 wherein the measuring system is English and the number of teeth for the rotary scale member is 100.

5. A shaft position transducer adapted to be mounted on a shaft as defined in claim 3 wherein the measuring system is metric and the number of teeth for the rotary scale is 127.

6. A shaft position transducer adapted to be mounted on a shaft as defined in claim 1 wherein the bushing mounts another rotary scale defined in the same manner as the other rotary scale and mounted on the bushing in a spaced, side-by-side relationship with the other rotary scale, one rotary scale having scale divisions for measuring linear increments in the English system and the other rotary scale having scale divisions for measuring linear increments in the metric system, the other piece of said housing being further defined with another internal circular opening for permitting said other rotary scale to rotate therein and be completely enclosed within said other circular opening, another pair of cavities for mounting a light sensing package in each of the cavities defined on the inside surface of the other housing piece at a location spaced radially outwardly of said other circular opening for said other rotary scale, each cavity having a small opening communicating with said other internal circular opening located within the other housing piece, another pair of light sensing packages each having a light source and a light sensor arranged therein to be snugly mounted in each of said another pair of cavities without the possibility of movement when in use, the light sensing packages being further defined to permit the light rays emitted from each of said light sources to impinge on the rotary scale by being conveyed through the individual small opening and to be reflected therefrom and being reconveyed through said small opening to impinge on the light sensor for providing electrical analog signals representative of the optically sensed gear teeth that have the same output phase relationship as the first mentioned analog signals.

7. A shaft position transducer adapted to be mounted on a shaft as defined in claim 1 wherein the pair of cavities for mounting the circuit element package are geometrically defined relative to the gear teeth for providing electrical output signals from each circuit element package that has a predetermined out of phase relationship.

8. A shaft position transducer adapted to be mounted on a shaft as defined in claim 7 wherein the phase relationship is 90 degrees.

9. A shaft position transducer adapted to be mounted on a shaft as defined in claim 6 wherein the rotary scales are rendered light absorbing throughout and the top surfaces of the teeth are polished for rendering them light reflective, the interior surfaces of said housing pieces being light absorbing throughout whereby only the top surfaces of the teeth are capable of reflecting light rays.

10. A shaft position transducer adapted to be mounted on a shaft as defined in claim 6 wherein said housing is constructed and defined to mount the light sensing packages in each of the packages without the need for adjustment.

11. A shaft position transducer adapted to be mounted on a shaft as defined in claim 6 wherein the pair of cavities for mounting the light sensing packages are geometrically spaced relative to the individual rotary scale member to each produce a train of electrical signals from each light sensor that are in an electrical phase quadrature relative to one another.

12. A shaft position transducer adapted to be mounted on a shaft as defined in claim 11 wherein each pair of cavities are constructed and defined for receiving the light sensing packages in a preselected, fixed relationship with the rotary scale, without the need for adjustments, for producing the electrical signals in phase quadrature.

* * * * *